May 5, 1936.  J. E. FREEBORN  2,039,590
FRICTION CLUTCH
Filed Sept. 21, 1934  2 Sheets-Sheet 1

INVENTOR,
James Edward Freeborn
BY
Frank S. Appleman,
ATTORNEY.

May 5, 1936.  J. E. FREEBORN  2,039,590
FRICTION CLUTCH
Filed Sept. 21, 1934   2 Sheets-Sheet 2
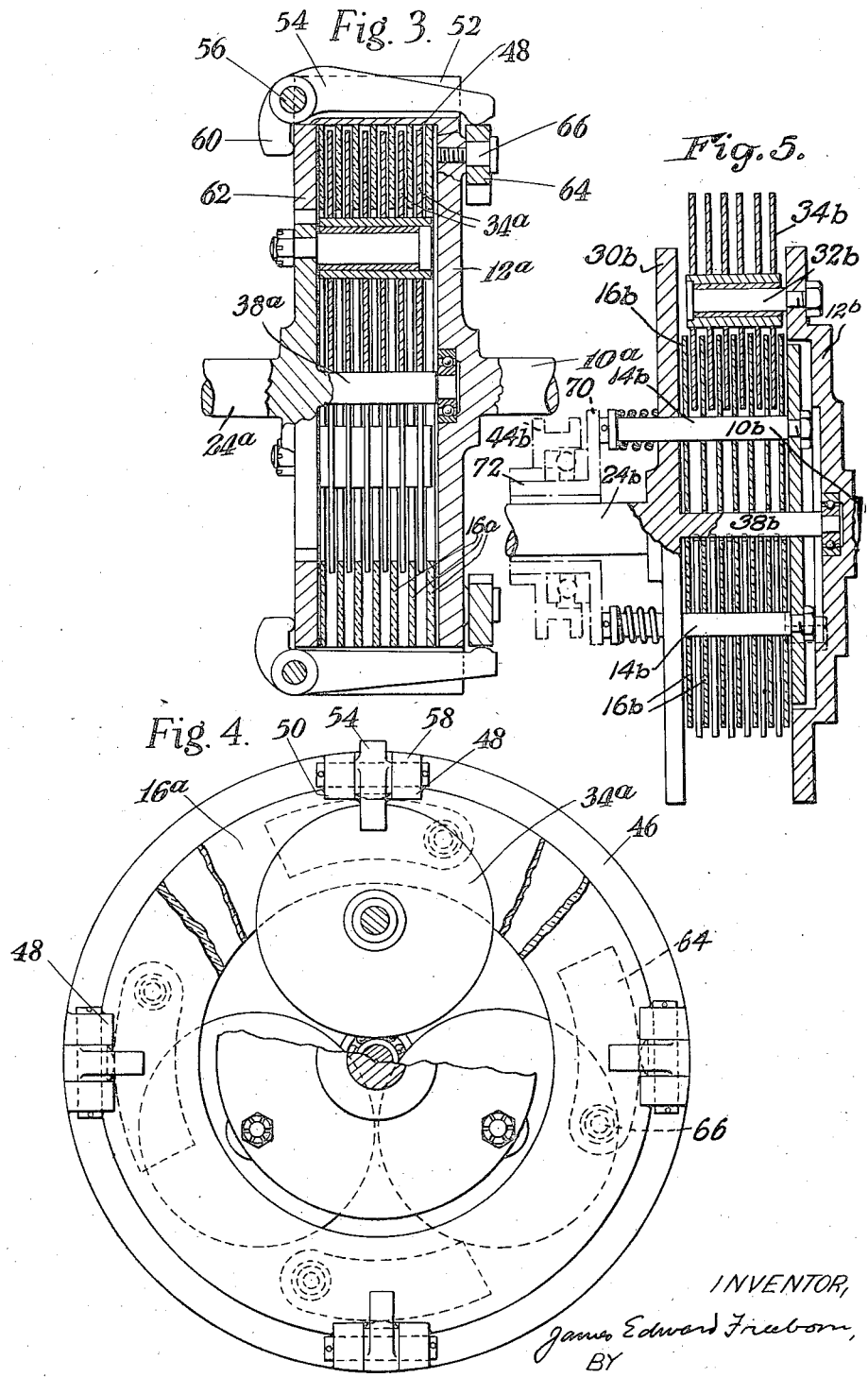
INVENTOR,
James Edward Freeborn,
BY
Frank S. Appleman,
ATTORNEY.

Patented May 5, 1936

2,039,590

UNITED STATES PATENT OFFICE 2,039,590

FRICTION CLUTCH

James Edward Freeborn, London, England, assignor to Freeborn Power Converters Limited, London, England, a British company Application September 21, 1934, Serial No. 744,995
In Great Britain October 4, 1933

5 Claims. (Cl. 192—69)

This invention relates to friction clutches of the plate type. Heretofore the plates of such clutches have been of disc or ring formation with one plate or set of plates connected to the driving member and the other plate or set connected to the driven member, a spring or other suitable means being provided for exerting a controlled pressure between the respective plates for taking up the drive. The torque is transmitted by the effects of friction between the plates whether these be rotating at equal speed which occurs when the full torque is being transmitted or whether they be slipping in taking up the drive. There are really two different forms of friction involved in these two cases, the first being static friction when there is no relative movement between the plate surfaces in contact and the second, which may be termed "drag friction", which occurs when there is relative movement between the plates in taking up the drive. It is high rubbing velocity producing this "drag friction" which, in existing plate clutches, gives rise to the well known troubles of heat and wear which result from the considerable energy involved in rotating one set of plates in contact with the other set. The chief object of the present invention is to devise a clutch in which the aforesaid "drag friction" is substantially reduced as compared with existing clutches, with a consequent decrease in the wear and tear on the plates, and in which the heat produced by such friction is more effectually dissipated.

According to the present invention one plate or set of plates consists of a disc or set of discs mounted to rotate upon one of the clutch members about an axis which is eccentric with respect to the axis of rotation of the clutch, so that a portion only of the surface of the disc, or of each disc, is in contact with the plate or plates carried by the other clutch member.

In the preferred construction a set of discs is interleaved with a set of plates, and there may be, and usually is, more than one set of discs, for example three sets arranged 120° apart.

The relative velocity between the contacting surfaces of the discs and plates in taking up the drive is low, with the result that the "drag friction" is minimized. This effect will be readily understood if the discs are regarded in the same way as wheels running on a road. In the case of such a wheel each point on the wheel performs a cycloidal path in which the relative velocity changes from zero at the point of contact with the road to the maximum at a point immediately over the wheel axis. In the improved clutch similar considerations apply and only the portions of the contacting surfaces corresponding to the lower velocity portions of the curve are subjected to rubbing owing to the fact that points on the discs move out of contact with the plates of the other clutch member at the positions where the higher velocities occur. The part of the disc or of each disc which is out of contact with the plates is available for the dissipation of any heat that may be generated, and the proportion of the area so available may be considerably more than one-half. Furthermore, the discs and plates are self-cleaning and self-lubricating due to the fact that new films of oil are being constantly introduced to the contacting surfaces by the discs, whereas with existing plate clutches the pressure between the two sets of plates tends to squeeze the oil out from between the plates.

Referring to the accompanying drawings,

Figure 1 is a side elevation partly in section of a clutch according to this invention which is operated by a pedal, lever or the like.

Figures 3 and 4 are views similar to Figures 1 and 2 of a clutch operated automatically by centrifugal action, and Figure 5 is a view similar to Figure 1 of a modified construction.

Figure 1:
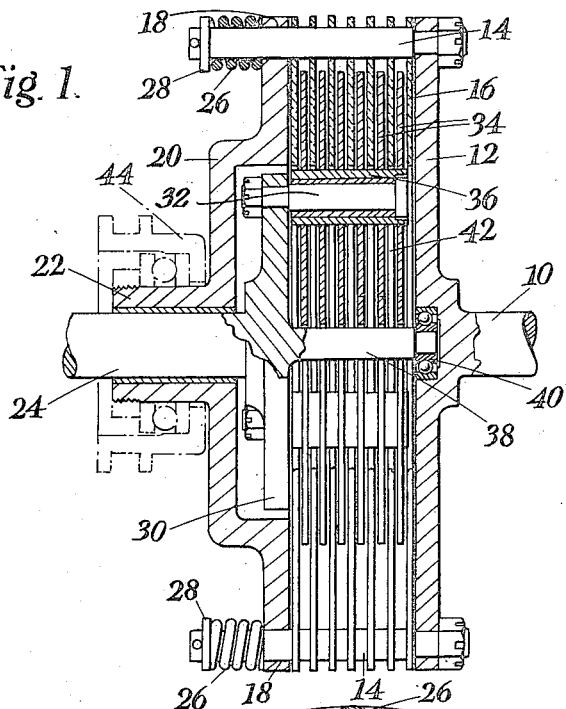
Figure 2:
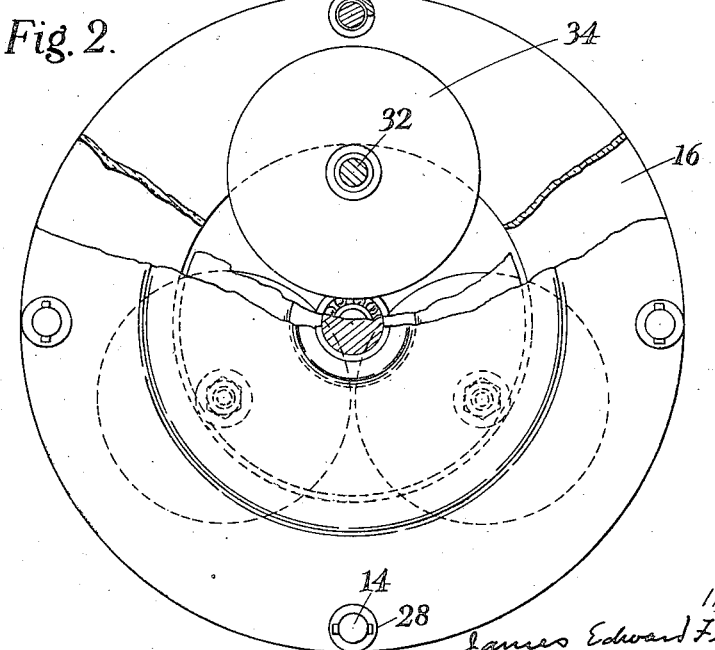
Figure 2 is an end elevation of the clutch as seen from the left in Figure 1, parts being broken away to show the internal construction.

Referring first to Figures 1 and 2, a driving shaft 10 carries a disc 12 to which are secured near its periphery four pins 14 extending parallel to the axis of the driving shaft. A number of similar friction rings 16 are supported on these pins and constitute the driving elements of the clutch.

The pins 14 extend through holes 18 in a disc 20 provided with a sleeve 22 which forms a bearing for the driven shaft 24. Each pin 14 carries a coil spring 26 which bears on the disc 20 and abuts against a collar 28 secured to the pin near its end. The boss 22 being free to slide on the shaft 24 the springs 26 will press the disc 20 towards the right in Figure 1.

The driven shaft 24 carries a disc 30 to which are attached near its periphery three pins 32 extending parallel to the axis of the shaft within the rings 16. Metal discs 34 constituting the driven elements of the clutch are mounted to slide freely on sleeves 36 which can rotate upon the pins 32, and these discs 34 alternate with the rings 16. An extension 38 of the shaft 24 is carried in ball bearings 40 housed in the centre of the disc 12.

It will be seen from Figure 2 that less than half the area of any one of the discs 34 is in contact at any time with the rings 16 which embrace it, the rest of the area being exposed on both sides. The springs 26 are designed to exert sufficient force to clamp the discs 34 between the rings 16 tightly enough to prevent the discs from rotating upon the pins 32 when the maximum torque for which the clutch is designed is being transmitted. It will be appreciated that if the disc 20 is moved to the left against the action of the springs 26 the pressure between the discs 34 and the rings 16 will be relieved, with the result that the discs can rotate about the pins 32. The clutch will then slip and the discs will rub against the rings. The linear speed of this rubbing action will, however, be less than would be the case, for the same amount of slip, if the discs 34 were fixed rigidly to the disc 30. Moreover, any point on a disc 34 is in contact with the adjacent ring 16 only at intervals, these intervals alternating with free periods during which this point is free of the ring and exposed to the air in the spaces 42 between the discs. Thus, heat which is generated during less than half of the rotation period of the discs is dissipated during the remainder of the rotation period.

The clutch is operated in any usual manner through a fork, not shown, engaging a spool 44.

Referring now to Figures 3 and 4, the construction is for the most part the same as that described with reference to Figures 1 and 2, the corresponding parts being indicated by similar reference numerals with the suffix a. The parts 14, 20, 22, 26 and 28 are, however, omitted.

The disc 12a is provided with a cylindrical flange 46 which extends around the rings 16a and this flange is provided with four symmetrically spaced inward projections 48 which engage in notches 50 in the rings 16a, thus transmitting the drive from the shaft 10a to the rings. The flange 46 is externally slotted as at 52 opposite the projections 48 to accommodate bell crank levers 54 pivoted freely on pivot pins 56 carried by lugs 58 on the flange. The arms 60 of the levers 54 bear against a loose ring 62 which abuts against the left-hand ring 16a and which is mounted in the flange 46 in exactly the same manner as the rings 16a.

Four centrifugal levers 64 are pivoted on pivot pins 66 carried by the disc 12a and the outer edges of these centrifugal levers bear against the right-hand ends of the individual levers 54. It will thus be seen that the rotation of the shaft 10a will cause the levers 64 to swing outwards under centrifugal force and that this force will be transmitted through levers 54, 60 to the plate 62 and thereby cause the discs 34a to be pressed between the rings 16a. The pressure between the rings and the discs will be proportional to the speed of the driving shaft, and the degree of slip will therefore be inversely proportional to that speed. The clutch therefore operates as an automatically slipping clutch, the slip decreasing as the speed increases.

Owing to the rotational movement of the discs during slipping, the films of lubricating oil between the discs and the rings are continually renewed.

In Figure 5 which illustrates a modification of the construction shown in Figures 1 and 2 similar parts are indicated by similar reference numerals with the suffix b. Whereas in the construction of Figures 1 and 2 the pins 32 are situated within the rings 16, in Figure 5 the pins 32b are out-side the rings 16b. The result of this change is that the parts of the discs not in contact with the rings are exposed freely to the surrounding air whereby the heat generated by friction is more effectually dissipated. In this modified construction the discs 34b are the driving elements of the clutch and the discs 16b equivalent to the rings 16 (Figure 1) constitute the driven elements. The pins 32b on which the discs 34b are mounted to rotate, are carried by the disc 12b near its periphery. The pins 14b on which the discs 16b are supported extend through holes in the disc 30b and are attached to an additional pressure disc 68 sliding on the extension 38b of the shaft 24b. A flange 70 on a bush 72 sliding upon the shaft 24b engages the ends of the pins 14b and the spool 44b enables the flange 70, and therefore the pins 14b, to be moved to the right to release the clutch.

It will be evident that the invention is applicable to brakes as well as to clutches, and the term "clutch" used herein is to be understood to include brakes.

I claim:—

1. A plate clutch comprising a driving member, a driven member coaxial therewith, a set of plates carried by one of said members, at least two spindles carried by the other of the said members said spindles being parallel to the rotational axis of the clutch, at equal distances therefrom and symmetrically placed with respect to said axis, a set of discs mounted to rotate freely upon each of said spindles, said discs being interleaved between the aforesaid plates so as to alternate therewith and being in contact therewith over not more than one half of their surfaces, and means for pressing said discs and plates together.

2. A plate clutch comprising a driving member, a driven member coaxial therewith, a plurality of clutch plates in the form of rings carried by one of said members, at least two spindles carried by the other of said members, said spindles being parallel to the axis of rotation of the clutch, situated within said rings close to the inner edges thereof and symmetrically disposed with respect to said axis, a set of discs mounted to rotate freely upon each of said spindles said discs being interleaved between said rings so as to alternate therewith and being in contact therewith over not more than one half of their surfaces and means for pressing said discs and plates together.

3. The invention of claim 1 wherein the axis of rotation of the discs is situated outside the periphery of the plates.

4. The invention of claim 1 wherein the means for pressing the plates and discs together comprises at least one centrifugal lever pivoted about an axis parallel to the axis of the clutch and at least one bell crank lever cooperating with said centrifugal lever and the clutch plates to transmit the outward movement of the centrifugal lever to said plates.

5. A plate clutch comprising driving and driven members, plates mounted upon one of said members to rotate eccentrically with respect to the axis of rotation of the clutch and plates mounted concentrically upon the other clutch member, said first mentioned plates having parts only of their surfaces in contact with the plates of the other clutch member, said parts lying substantially wholly on one side of diameters of such first mentioned plates.

JAMES EDWARD FREEBORN.